United States Patent
Colon

(10) Patent No.: US 8,239,464 B2
(45) Date of Patent: *Aug. 7, 2012

(54) METHOD AND INSTANTANEOUS MESSAGING SYSTEM FOR MOBILE TERMINALS EQUIPPED WITH A VIRTUAL PRESENCE SERVER CONFIGURED TO MANAGE DIFFERENT CONTACT LISTS OF A SINGLE USER

(75) Inventor: François Colon, Marseilles (FR)

(73) Assignee: Miyowa, Marseilles (FR)

( * ) Notice: Subject to any disclaimer, the term of this patent is extended or adjusted under 35 U.S.C. 154(b) by 242 days.

This patent is subject to a terminal disclaimer.

(21) Appl. No.: 12/024,156

(22) Filed: Feb. 1, 2008

(65) Prior Publication Data

US 2009/0113007 A1    Apr. 30, 2009

(51) Int. Cl.
    *G06F 15/16*    (2006.01)
(52) U.S. Cl. ........ 709/206; 709/203; 709/205; 709/207; 379/93.01; 370/252; 370/349
(58) Field of Classification Search .................. 709/203, 709/205, 206, 207; 455/414.1, 435.1; 370/252, 370/349; 379/93.01
See application file for complete search history.

(56) References Cited

U.S. PATENT DOCUMENTS

| | | | |
|---|---|---|---|
| 5,870,605 | A | 2/1999 | Bracho et al. |
| 6,377,691 | B1 | 4/2002 | Swift et al. |
| 6,434,600 | B2 | 8/2002 | Waite et al. |
| 6,504,480 | B1 | 1/2003 | Magnuson et al. |

(Continued)

FOREIGN PATENT DOCUMENTS

EP    0915590 A2    5/1999

(Continued)

OTHER PUBLICATIONS

Cheddad, Abbas et al.; "Digital Image Steganography: Survey and Analysis of Current Methods;" Signal Processing, Elsevier Science, vol. 90, No. 3, Publishers B.V. Amsterdam, NL, XP026748102, ISSN: 0165-1684, Sep. 6, 2009; pp. 727-752.

(Continued)

*Primary Examiner* — Thu Ha Nguyen
(74) *Attorney, Agent, or Firm* — Harness, Dickey & Pierce, P.L.C.

(57) ABSTRACT

The invention relates to an instantaneous messaging system for mobile terminals comprising one or several instantaneous messaging service servers (S1, S2) able to deliver instantaneous messaging services to mobile terminals (TA, TB1, TC1, TD1, TB2, TE2, TF2) connected to said servers and of which the users (A, B1, C1, D1, B2, E2, F2) have opened an instantaneous messaging session, and a virtual presence server (100) independent of the existing instantaneous messaging service servers (S1, S2), said virtual presence server being connected to at least one mobile client terminal (TA) and to at least one of the existing messaging servers (S1, S2) in such a way that the information intended for or sent by said mobile client terminal transits by said virtual presence server, wherein the instantaneous messaging service servers (S1, S2) are configured to transmit contact lists intended for mobile client terminal (TA), said lists being intercepted by the virtual presence server (100), the latter comprising a means to aggregate the different contact lists received and only manage a single list (110) in which are registered the identities of the different users (B1, C1, D1, B2, E2, F2), without distinction as to the community that said users are members of.
The invention also relates to a method making it possible to manage different contact lists of a single user in an instantaneous messaging session.

20 Claims, 2 Drawing Sheets

U.S. PATENT DOCUMENTS

| | | | |
|---|---|---|---|
| 7,032,030 B1 | 4/2006 | Codignotto | |
| 7,353,016 B2 | 4/2008 | Roundtree et al. | |
| 7,389,324 B2 | 6/2008 | Masonis et al. | |
| 7,619,584 B2* | 11/2009 | Wolf | 345/1.2 |
| 7,685,236 B1 | 3/2010 | Harik et al. | |
| 7,698,370 B1* | 4/2010 | Hall | 709/206 |
| 2001/0013050 A1* | 8/2001 | Shah | 709/202 |
| 2001/0014868 A1 | 8/2001 | Herz et al. | |
| 2002/0010746 A1 | 1/2002 | Jilk et al. | |
| 2003/0073440 A1 | 4/2003 | Mukherjee et al. | |
| 2003/0208557 A1 | 11/2003 | Higbee et al. | |
| 2003/0232618 A1 | 12/2003 | Le et al. | |
| 2004/0052238 A1* | 3/2004 | Borella et al. | 370/349 |
| 2004/0056901 A1 | 3/2004 | March et al. | |
| 2004/0086100 A1 | 5/2004 | Moore et al. | |
| 2004/0143632 A1 | 7/2004 | McCarty | |
| 2004/0143633 A1 | 7/2004 | McCarty | |
| 2004/0177119 A1* | 9/2004 | Mason et al. | 709/206 |
| 2004/0266402 A1 | 12/2004 | Schavitz | |
| 2005/0030913 A1 | 2/2005 | Roy | |
| 2005/0044152 A1 | 2/2005 | Hardy et al. | |
| 2005/0055443 A1 | 3/2005 | Tosey et al. | |
| 2005/0080864 A1 | 4/2005 | Daniell | |
| 2005/0144587 A1 | 6/2005 | Bryant | |
| 2005/0198173 A1 | 9/2005 | Evans | |
| 2005/0205660 A1 | 9/2005 | Munte | |
| 2005/0243854 A1 | 11/2005 | Ward | |
| 2006/0009243 A1 | 1/2006 | Dahan et al. | |
| 2006/0014530 A1* | 1/2006 | Denenberg et al. | 455/414.1 |
| 2006/0085355 A1 | 4/2006 | Coley et al. | |
| 2006/0129643 A1 | 6/2006 | Nielson et al. | |
| 2006/0142880 A1 | 6/2006 | Deen et al. | |
| 2006/0168037 A1 | 7/2006 | Audu et al. | |
| 2006/0194596 A1 | 8/2006 | Deng | |
| 2006/0195506 A1 | 8/2006 | Deng | |
| 2006/0218234 A1 | 9/2006 | Deng et al. | |
| 2006/0240824 A1* | 10/2006 | Henderson et al. | 455/435.1 |
| 2006/0259632 A1 | 11/2006 | Crawford et al. | |
| 2006/0265510 A1 | 11/2006 | Warren et al. | |
| 2007/0038974 A1 | 2/2007 | Albahari et al. | |
| 2007/0042754 A1 | 2/2007 | Bajikar et al. | |
| 2007/0136814 A1 | 6/2007 | Lee et al. | |
| 2007/0192410 A1* | 8/2007 | Liversidge et al. | 709/204 |
| 2007/0233859 A1 | 10/2007 | Zhao et al. | |
| 2007/0239866 A1 | 10/2007 | Cox et al. | |
| 2007/0250496 A1 | 10/2007 | Halliday et al. | |
| 2007/0253340 A1* | 11/2007 | Varney et al. | 370/252 |
| 2007/0266076 A1* | 11/2007 | Cox et al. | 709/203 |
| 2007/0282963 A1 | 12/2007 | Mo et al. | |
| 2008/0040443 A1 | 2/2008 | Agrawal | |
| 2008/0120387 A1* | 5/2008 | Werndorfer et al. | 709/206 |
| 2008/0134295 A1* | 6/2008 | Bailey et al. | 726/4 |
| 2008/0183846 A1 | 7/2008 | Colon | |
| 2008/0235798 A1 | 9/2008 | Lu | |
| 2008/0244014 A1* | 10/2008 | Britton et al. | 709/206 |
| 2008/0267091 A1 | 10/2008 | Parkkinen et al. | |
| 2008/0288649 A1* | 11/2008 | Burckart et al. | 709/230 |
| 2008/0299953 A1 | 12/2008 | Rao | |
| 2009/0031244 A1* | 1/2009 | Brezina et al. | 715/781 |
| 2009/0068989 A1 | 3/2009 | Colon | |
| 2009/0083732 A1 | 3/2009 | Shen et al. | |
| 2009/0112988 A1 | 4/2009 | Colon | |
| 2009/0113007 A1 | 4/2009 | Colon | |
| 2009/0176498 A1 | 7/2009 | Colon | |
| 2009/0187634 A1 | 7/2009 | Colon | |
| 2009/0210507 A1* | 8/2009 | Haverkos | 709/206 |
| 2010/0057732 A1* | 3/2010 | O'Sullivan et al. | 707/6 |
| 2010/0077018 A1* | 3/2010 | Acharya et al. | 709/203 |
| 2010/0179982 A1 | 7/2010 | Colon | |
| 2010/0199340 A1* | 8/2010 | Jonas et al. | 726/8 |
| 2010/0217809 A1* | 8/2010 | Vymenets et al. | 709/206 |
| 2010/0228790 A1 | 9/2010 | Colon | |
| 2010/0293376 A1 | 11/2010 | Colon | |
| 2011/0016512 A1 | 1/2011 | Colon | |

FOREIGN PATENT DOCUMENTS

| | | |
|---|---|---|
| EP | 1587239 A1 | 10/2005 |
| EP | 1643744 A1 | 4/2006 |
| FR | 2868177 A1 | 9/2005 |
| WO | WO-2004/059447 A2 | 7/2004 |
| WO | WO-2006/084183 A1 | 8/2006 |

OTHER PUBLICATIONS

European Search Report_EP07291423, dated Mar. 31, 2008.

French Search Report for Application No. FR 0706244, dated Feb. 19, 2008.

French Search Report for Application No. FR 0850285, dated Sep. 15, 2008.

Kalika, Gabrielle; www.mobilemarketer.com; "Miyowa launches mobile social networking application;" Aug. 11, 2008; 2 pgs.

Ngo, Dong; http://news.cnet.com; "Miyowa's InTouch5: Cell phone contact evolved;" Aug. 5, 2008; 2 pgs.

Preliminary Search Report for French Application 0901849, dated Feb. 19, 2010.

Radek Kantor, "IV054—Chapter 13: Steganography and Watermarking;" Extract from the Internet, XP002569385, Oct. 17, 2003; 17 sheets of 34 slides.

Rishi, Lata et al; "Presence and Its Effect on Network;" Personal Wireless Communications, ICPWC 2005, 2005 IEEE International Conference on New Delhi, India, Jan. 23-25, 2005, Piscataway, New Jersey; XP010798582, pp. 368-372.

www.miyowa.com; "Miyowa launches MoveMessenger;" Jul. 25, 2006; 2 pgs.

* cited by examiner

METHOD AND INSTANTANEOUS MESSAGING SYSTEM FOR MOBILE TERMINALS EQUIPPED WITH A VIRTUAL PRESENCE SERVER CONFIGURED TO MANAGE DIFFERENT CONTACT LISTS OF A SINGLE USER

PRIORITY

The present application claims priority to French Patent Application No.: FR 07/07483 filed on Oct. 24, 2007; the entire contents of which are incorporated herein by reference.

FIELD OF THE INVENTION

The invention generally relates to the technical field of instantaneous messaging systems on mobile terminals and more particularly the field of routing information in an instantaneous messaging system.

In one aspect, the present invention relates to an instantaneous messaging system for mobile terminals equipped with a virtual presence server configured to manage different contact lists of a single user. The invention also relates to a method making it possible to manage different contact lists of a single user in an instantaneous messaging session.

BACKGROUND OF THE INVENTION

When a user wishes to open an instantaneous messaging session, a computer application placed in his mobile terminal sends a presence request intended for the messaging server. This presence request generally contains data making it possible to identify the user. Once the user has been identified by the messaging server, the latter sends to the other users that have opened a session, a piece of information indicating the presence of said user and his wish to converse. The computer application periodically sends the presence requests to the instantaneous messaging server according to a certain frequency.

When the user closes his messaging session, the computer application sends a disconnection request intended for the instantaneous messaging server. This disconnection request indicates to the messaging server that the user wishes to close his session and that he no longer wishes to converse with the other users. The messaging server then informs the other users of this event.

It may happen that a mobile terminal user cannot, or does not wish to, keep his instantaneous messaging session open constantly. This may be the case when the user is in a meeting, driving his car, etc. In such situations and with systems known in the art, either the user closes his session or he keeps it open but without conversing.

In the case where the user closes his session, the other users will be informed of this closing and they will stop conversing with him. This can be detrimental for the user, since he no longer receives any information at all until he opens a session again.

In the case where the user keeps his session open, he will no longer be able to converse with the other users. It can be unpleasant for the other users to not receive prompt replies from their correspondent, especially when the instantaneous messaging service is perceived as a means to be reach others in real time. This situation shows a first disadvantage with messaging systems known in the art.

In conventional instantaneous messaging systems, instantaneous messaging servers are able to deliver instantaneous messaging services to terminals connected to the servers, the users of which have opened an instantaneous messaging session.

Instantaneous messaging servers are in particular configured to detect a user connected to the instantaneous messaging service and inform the other users of his presence so that they may converse. These instantaneous messaging service servers are equipped with limited and very general features.

Other more complex services such as message filtering can be delivered by the messaging servers, but are not necessarily present in all messaging servers. If these services are not necessarily present, integrating such new services for use in a mobile terminal is a long and costly process for the operators, since a large number of initially provided management protocols and Software/Hardware must be modified. This is a second disadvantage found in known messaging systems of the art.

An instantaneous messaging system for mobile terminals known in the art is shown in FIG. 1. User A may have different contact lists, for example two in the instant case: a first list containing three contacts B1, C1, D1 members of a first instantaneous messaging service community Co1, for example YAHOO®; and a second list containing three other contacts B2, E2, F2 members of a second community Co2, for example MSN®. These contact lists are generally sent by the instantaneous messaging service servers S1, S2, to user A's mobile terminal TA. If user A wishes to converse with users B1, C1 and D1, he must connect to the instantaneous messaging server S1 associated with the first community Co1. If user A subsequently wishes to converse with users B2, C2 and D2 registered on the second community Co2, for example MSN®, he must disconnect from the first server S1 and connect to instantaneous messaging server S2 associated with this second community. This method is therefore laborious and sequential. In addition, there is no link between the different contact lists. For example, if user B is registered on several lists, it is not possible to have him appear one single time in a single list.

In order to efficiently manage a conversation via a instantaneous messaging service, it is simpler to converse only with a single portion of one's contacts and filter the messages from users with whom one does not to converse. Indeed, if all of the users converse at the same time, the conversation quickly becomes difficult to follow, all the more so when using a mobile terminal. To that end, user A can define filtering rules in such a way as to block messages intended for or sent by users with whom he does not wish to converse.

In the example shown in FIG. 1, concerning community Co1, user A wishes to converse only with user B1. Concerning community Co2, user A wishes to converse with users B2 and E2 and not with user F2. To that end, user A sends a request to server S1 intended to indicate that:

only messages coming from users B1, B2 and E2 can be communicated to him and/or messages sent by user A must only be intended for users B1, B2 and E2 (B1=OK; B2=OK; E2=OK);

messages coming from users C1, D1 and F2 must be blocked and/or messages sent by user A must not be sent to users C1, D1 and F2 (C1=NO; D1=NO; F2=NO).

The filtering techniques are known by those skilled in the art. In principle, they involve filtering rules developed by the operators of instantaneous messaging service and integrated into their existing instantaneous messaging service servers. Currently, integrating filtering rules into instantaneous messaging service servers is a long and costly process for the operators, since a large number of management protocols and Software/Hardware must be modified. This reflects a third disadvantage present in known messaging systems of the art.

Another possibility that can be considered by those skilled in the art consists in integrating the filtering rules into the software of the mobile terminal which makes it possible to connect to the messaging servers. However, these filtering rules are known only by the software of the mobile terminal and the user will not retrieve these rules if he connects using another mobile terminal. In addition, this solution burdens the software of the mobile terminal since the data must be stored. This becomes a handicap in the case of mobile terminals having little or no storage and processing capacities.

In reference to the example in FIG. 1, the same user B can be a member of two different communities Co1 and Co2. In this case, he will have two different identities according to whether he is connected to one or the other community, for example B@Co1.com and B@Co2.com.

When user B opens an instantaneous messaging session on the first community Co1, he is seen by user A's mobile terminal as a first user B1 having, for example, B@Co1.com as identity. Likewise, when user B opens an instantaneous messaging session on a second community Co2, he is seen by user A's mobile terminal as a second user B2 having, for example B@Co2.com as identity.

In the instantaneous messaging service systems known in the art, in the case where user A wishes to establish a filtering rule for user B, two identical rules must be defined: one for user B1 and another for user B2. Regrettably, current systems do not allow user A to define a single filtering rule concerning user B and to apply this single rule to users B1 and B2. This is yet another disadvantage that affects messaging systems known in the art.

Thus, there remains a need to simplify the management of contact lists in an instantaneous messaging session in such a way that a user can easily converse with all of these contacts. In particular, there remains a need to simplify the implementation of the filtering rules in an instantaneous messaging system. There also remains a need to be able to add new instantaneous messaging services in a system known in the art, without having to modify the management protocols and/or Software/Hardware that is initially installed in the existing messaging servers. Furthermore, there remains a need to allow a user to easily continue an instantaneous messaging session when he cannot, or does not wish, to keep his session open. Finally, there remains a need to simplify the connection to the diverse instantaneous messaging service communities.

SUMMARY OF THE INVENTION

In a first aspect, there is provided an instantaneous messaging system for mobile terminals, comprising:
one or several instantaneous messaging service servers (S1, S2) able to deliver instantaneous messaging services to mobile terminals (TA, TB1, TC1, TD1, TB2, TE2, TF2) connected to said servers and of which the users (A, B1, C1, D1, B2, E2, F2) have opened an instantaneous messaging session,
a virtual presence server (100) independent of existing instantaneous messaging service servers (S1, S2), said virtual presence server being connected to at least one mobile client terminal (TA) and to at least one of the existing messaging servers (S1, S2) in such a way that the information intended for or sent by said mobile client terminal transits by said virtual presence server,
wherein the instantaneous messaging service servers (S1, S2) are configured to transmit contact lists intended for mobile client terminal (TA), said lists being intercepted by virtual presence server (100), the latter comprising a means to aggregate the different contact lists received and only manage a single list (110) in which are registered the identities of the different users (B1, C1, D1, B2, E2, F2), without distinction as to the community that said users are members of.

In certain embodiments, mobile client terminal (TA) comprises a means to transmit a piece of information to virtual presence server (100) indicating that users (B1, B2) having different identities must be treated as a single user (B), said virtual presence server being able to connect to the instantaneous messaging server (S1, S2) to which the mobile terminal of said user (B) is connected.

In certain embodiments:
virtual presence server (100) comprises means for automatically managing an instantaneous messaging session in place of said user (A),
messaging servers (S1, S2) comprise a means to transmit a presence request to said virtual presence server (100) when a new user registered in the contact lists opens an instantaneous messaging session,
receiving this request controls said means of management in such a way that it sends an alert message intended for mobile client terminal (TA) during automatic management of the messaging session.

In certain embodiments, virtual presence server (100) comprises a database containing filtering rules intended to be applied to the messages sent by terminals (TB1, TC1, TD1, TB2, TE2, TF2) of users (B1, C1, D1, B2, E2, F2) registered in the contact lists.

In certain embodiments, virtual presence server (100) comprises a means to transmit an alert message to terminals (TC1, TD1, TF2) of users (C1, D1, F2) of which the messages have been filtered.

In certain embodiments, virtual presence server (100) comprises a means to transmit an alert message to the mobile client terminal (TA) when a message is filtered.

In certain embodiments, mobile client terminal (TA) comprises a computer application making it possible to transmit filtering rules associated with different users (B1, C1, D1, B2, E2, F2) to virtual presence server (100), said server being equipped with means to record these filtering rules in the database.

In certain embodiments, virtual presence server (100) is equipped with means to analyse the contact lists transmitted by the mobile client terminal (TA), and means to check if for each one of the users (B1, C1, D1, B2, E2, F2) registered in said lists, one or several filtering rules are already recorded in the database.

In certain embodiments, the mobile client terminal (TA) comprises a means to transmit a piece of information to virtual presence server (100) indicating that users (B1, B2) having different identities must be treated as a single user (B), said virtual presence server being able to connect to the instantaneous messaging server (S1, S2) to which the mobile terminal of said user (B) is connected; and the virtual presence server (100) is configured to apply the same filtering rule to the messages intended for or sent by the terminals of users (B1, B2) having different identities but having to be treated as a single user (B).

In another aspect, there is provided a method for automatically managing a session in a messaging system for mobile terminals, wherein:
terminals (TB1, TC1, TD1, TB2, TE2, TF2) connect to at least one instantaneous messaging server (S1, S2) in such a way that their users (B1, C1, D1, B2, E2, F2) can open an instantaneous messaging session, at least one mobile client terminal (TA) of one user (A) connects to a virtual presence server (100) independent of the existing instantaneous messaging service servers (S1, S2), virtual presence server (100) connects to at least one of the instantaneous messaging service servers (S1, S2) in such a way that the user (A) of mobile client terminal (TA) can open an instantaneous messaging session and converse with the other users (B1, C1, D1, B2, E2, F2), the information intended for or sent by said mobile client terminal transiting by said virtual presence server, contact lists intended for mobile client terminal (TA) are sent by the instantaneous messaging service server(s) (S1, S2), said lists being intercepted by virtual presence server (100), virtual presence server (100) aggregates the different contact lists received and only manages a single list (110) on which are registered the identities of the different users (B1, C1, D1, B2, E2, F2), without distinction of the community that said users are members of.

In certain embodiments, the mobile client terminal (TA) transmits a piece of information to virtual presence server (100) indicating that users (B1, B2) having different identities must be treated as a single user (B), said virtual presence server connecting to the instantaneous messaging server (S1, S2) to which the mobile terminal of said user (B) is connected.

In certain embodiments:

virtual presence server (100) comprises means to automatically manage an instantaneous messaging session in place of user (A) of mobile client terminal (TA), messaging servers (S1, S2) transmit a presence request to virtual presence server (100) when a new user registered in the contact lists opens an instantaneous messaging session, when said request is received and during automatic management of the session, the means of management sending an alert message intended for mobile client terminal (TA).

In certain embodiments, virtual presence server (100) comprises a database containing filtering rules applied to the messages sent by terminals (TB1, TC1, TD1, TB2, TE2, TF2) of users (B1, C1, D1, B2, E2, F2) registered in the contact lists.

In certain embodiments, the virtual presence server (100) transmits an alert message to terminals (TC1, TD1, TF2) of users (C1, D1, F2) of which the messages have been filtered.

In certain embodiments, virtual presence server (100) transmits an alert message to the mobile client terminal (TA) when a message is filtered.

In certain embodiments, mobile client terminal (TA) transmits filtering rules associated with different users (B1, C1, D1, B2, E2, F2) to virtual presence server (100), said server recording these filtering rules in the database.

In certain embodiments, virtual presence server (100) analyses the contact lists transmitted by the mobile client terminal, and checks for each one of the users (B1, C1, D1, B2, E2, F2) registered on said lists, if one or several filtering rules are already recorded in the database.

In certain embodiments, the mobile client terminal (TA) transmits a piece of information to virtual presence server (100) indicating that users (B1, B2) having different identities must be treated as a single user (B), said virtual presence server connecting to the instantaneous messaging server (S1, S2) to which the mobile terminal of said user (B) is connected; and virtual presence server (100) applies the same filtering rule to the messages intended for or sent by the terminals of users (B1, B2) having different identities but having to be treated as a single user (B).

DETAILED DESCRIPTION OF CERTAIN PREFERRED EMBODIMENTS OF THE INVENTION

Figure 1:
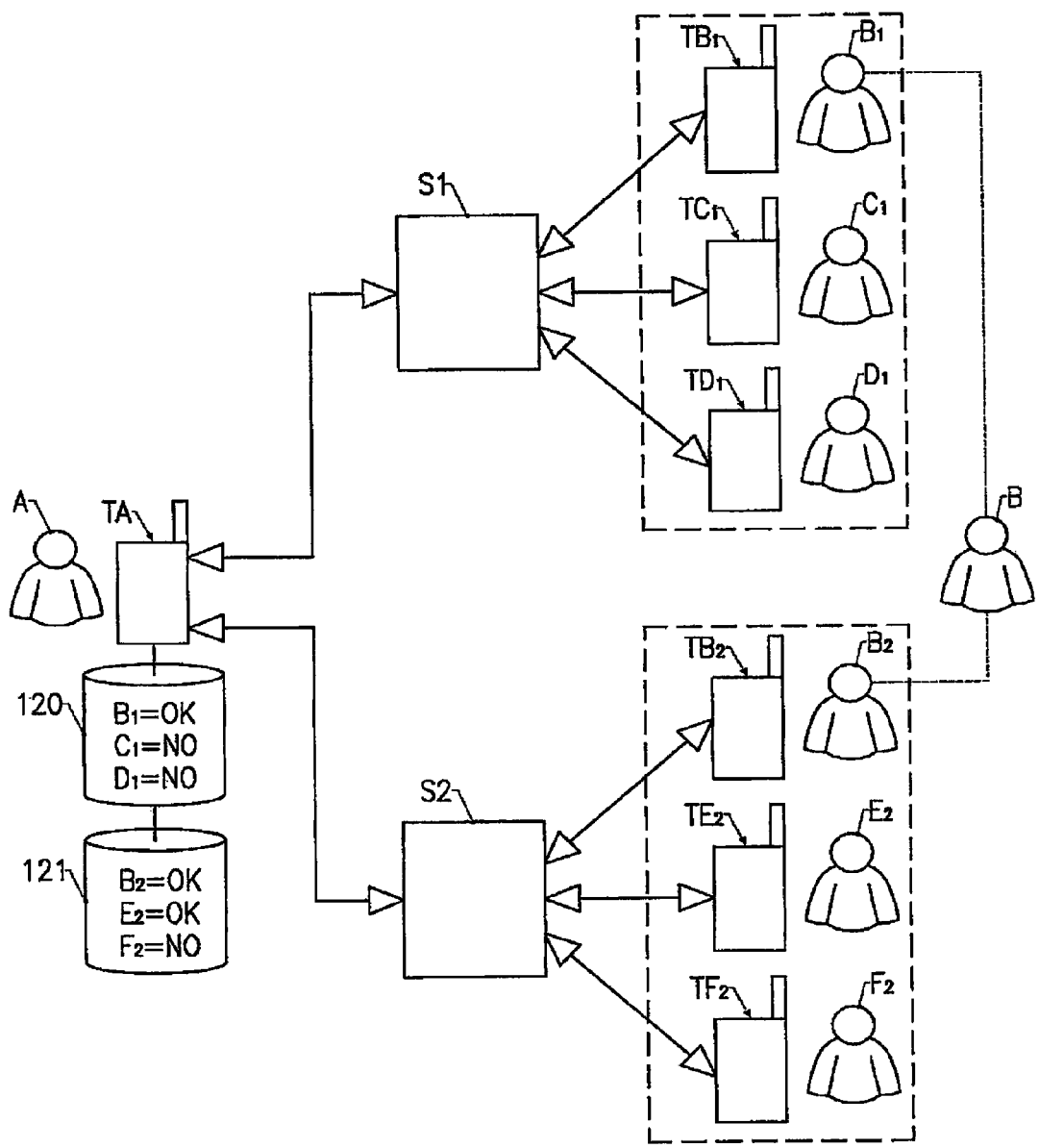
FIG. 1 is a schematic illustration of an instantaneous messaging system for mobile terminals according known in the art.

The present invention allows to overcome the aforementioned disadvantages of the art. For example, in one aspect, the invention provides an instantaneous messaging system for mobile terminals, comprising:

one or several instantaneous messaging service servers able to deliver instantaneous messaging services to mobile terminals connected to said servers and of which the users have opened an instantaneous messaging session, a virtual presence server independent of the existing instantaneous messaging service servers, said virtual presence server being connected to at least one mobile client terminal and to at least one of the existing messaging servers in such a way that the information intended for or sent by said mobile client terminal transits by said virtual presence server, wherein the instantaneous messaging service servers are configured to transmit contact lists intended for the mobile client terminal, said lists being intercepted by the virtual presence server, the latter comprising a means to aggregate the different contact lists received and manage only a single list in which is registered the identities of the different users, without distinction as to the community that said users are members of.

In certain embodiments, in order to optimise management of a user having several identities (i.e. registered in several contact lists), the mobile client terminal comprises a means to transmit a piece of information to the virtual presence server indicating that users that have different identities must be treated as a single user, said virtual presence server being able to connect to the instantaneous messaging server to which the mobile terminal of said user is connected.

In certain exemplary embodiments, the virtual presence server comprises means to automatically manage an instantaneous messaging session in place of the user of the mobile client terminal. In this case, in other exemplary embodiments of the invention allowing the user of the mobile client terminal to be informed of the presence of a new user when the virtual presence server is managing the session automatically, the messaging system servers comprise a means to transmit to said virtual presence server a presence request when a new user registered in the contact lists opens an instantaneous messaging session, the reception of this request controlling the means of management of said virtual presence server in such a way that said means of management sends an alert message intended for said mobile client terminal during automatic management of the messaging session.

In yet other exemplary embodiments of the invention making it possible to introduce filtering rules into an instantaneous messaging system known in the art, without modifying the initial architecture of the existing presence servers, the virtual presence server comprises a database containing filtering rules intended to be applied to the messages intended for or sent by the terminals of users registered in the contact lists transmitted to said server. To that end, in certain embodiments, the mobile client terminal is equipped with a computer application making it possible to transmit filtering rules associated with different users to the virtual presence server, said server being equipped with means to record these filtering rules in the database.

In yet other exemplary embodiments, the virtual presence server comprises a means to transmit an alert message to the users of which the messages have been filtered and/or to the mobile client terminal when a message is filtered.

In certain embodiments, simplifying management of filtering rules is desired. To that end, the virtual presence server may be equipped with means to analyse the contact lists transmitted by the mobile client terminal, and means to check whether, for each of the users registered in said lists, one or several filtering rules are already recorded in the database. In certain exemplary embodiments, the virtual presence server is configured to apply the same filtering rule to the messages intended for or sent by the terminals of users who have different identities, but who must be treated as a single user.

In another aspect, there is provided a method to automatically manage a session in a messaging system for mobile terminals, wherein:
- terminals connect to at least one instantaneous messaging server in such a way that their users can open an instantaneous messaging session,
- at least one mobile client terminal of a user connects to a virtual presence server independent of the existing instantaneous messaging service servers,
- the virtual presence server connects to at least one of the instantaneous messaging service servers in such a way that the user of the mobile client terminal can open an instantaneous messaging session and converse with the other users, with the information intended for or sent by said mobile client terminal transiting by said virtual presence server,
- contact lists intended for the mobile client terminal are sent by the instantaneous messaging service server(s), said lists being intercepted by the virtual presence server,
- the virtual presence server aggregates the different contact lists received and only manages a single list in which are registered the identities of the different users, without distinction as to the community that said users are members of.

Equivalents

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

Exemplification

Advantages and features of the invention can be understood further the examples that follow, which help illustrate some of the exemplary embodiments of the present invention. It will be appreciated, however, that these examples do not limit the invention. Variations of the invention, now known or further developed, are considered to fall within the scope of the present invention as described herein and as hereinafter claimed.

Figure 2:
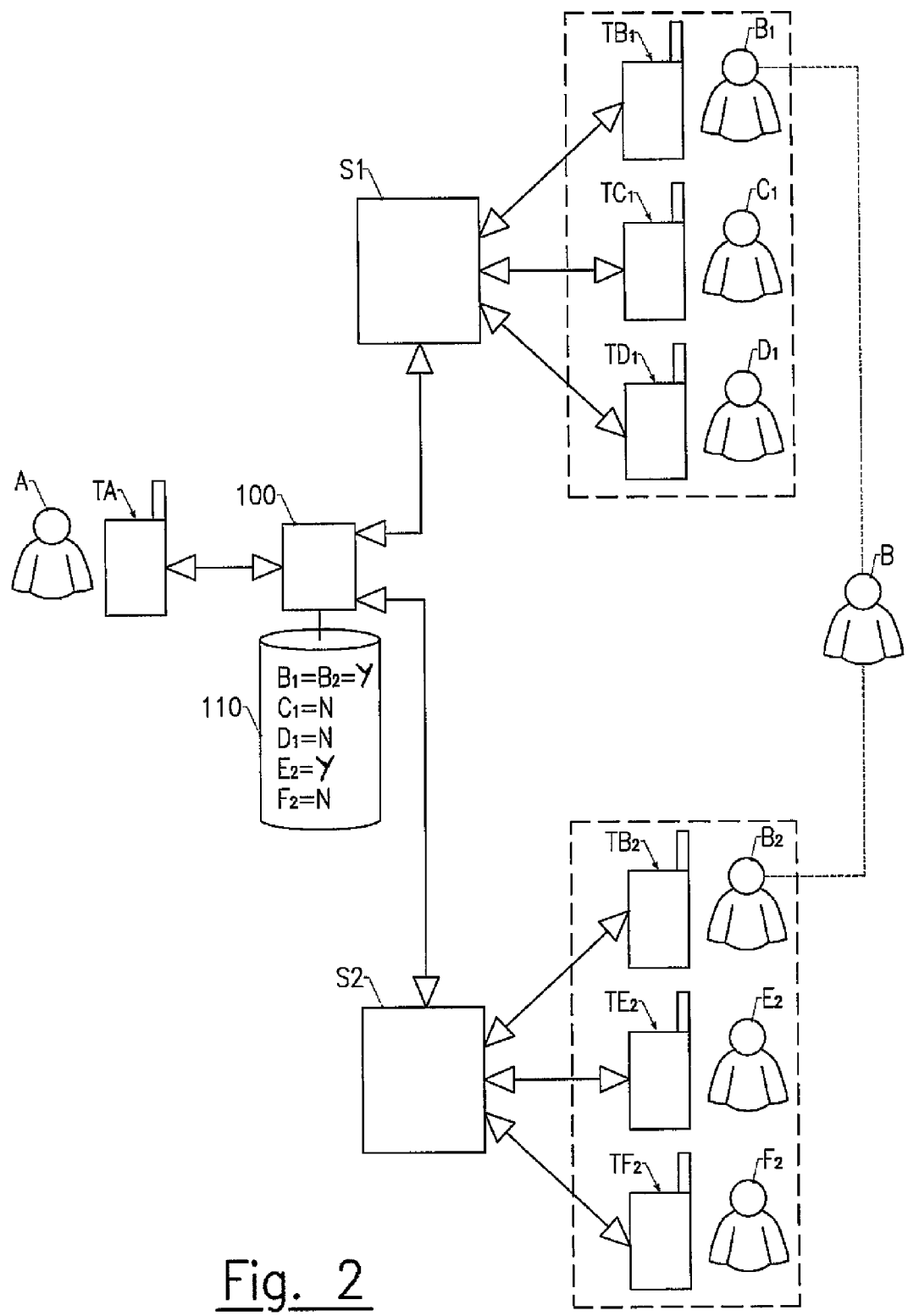
FIG. 2 is a schematic illustration of an exemplary instantaneous messaging system for mobile terminals according to the invention.

In reference to FIG. 2, the instantaneous messaging system which is the purpose of the invention comprises one or several instantaneous messaging service servers S1, S2, of the type known by those skilled in the art and able to deliver basic instantaneous messaging services such as transmitting messages, states of presence management, etc.

Servers S1, S2, are associated to the different instantaneous messaging service communities, respectively Co1, Co2. They are connected to a communications network (MSM®, Jabber®, Yahoo!®, etc.) normally used to implement the instantaneous messaging services. In a well known manner, these messaging servers are equipped with a processor, controller or any other equivalent means making it possible to manage the state of presence of the different users and more generally, the different events that occur in the system.

In the same way as in systems known in the art, servers S1, S2, are able to deliver instantaneous messaging services to terminals connected to said servers and of which the users have opened an instantaneous messaging session.

The mobile client terminals TA used to implement the invention can be mobile telephones, devices of the personal digital assistant (PDA) type, or any other mobile communications terminal able to connect to an instantaneous messaging service. The mobile terminals are configured to be connected to a communications network of the MSM®, Jabber®, Yahoo!®, etc. type. This type of mobile terminal is used by user A in the remainder of the description.

The other terminals TB1, TC1, TD1, TB2, TE2, TF2, used are able to connect to the instantaneous messaging service. They can be of the mobile telephone, personal digital assistant (PDA) or other type, but also non-mobile such as computers. This type of terminal is used by users B1, C1, D1, B2, E2, F2 in the remainder of the description.

Users B1, C1, D1, B2, E2, F2, connect in a conventional way to instantaneous messaging service servers S1 and/or S2 in order to open an instantaneous messaging session.

In accordance with the invention, means making it possible to implement instantaneous messaging services are shifted in a virtual presence server 100 that is independent of existing instantaneous messaging service servers S1, S2. In practice, virtual presence server 100 is a computer or a computer programme configured to provide certain instantaneous messaging services to the mobile terminals of the clients that connect to it.

Virtual presence server 100 can in particular be equipped with means making it possible to automatically manage an instantaneous messaging session in place of a user, filter messages and manage the contact lists of a user. However, other services such as: weather forecasts, advertisements, games, audio messaging, or others can be implemented.

The use of virtual presence server 100 thus makes it possible to add new features to an instantaneous messaging system known in the art, without having to modify existing messaging serves S1 and S2.

In reference to FIG. 2, virtual presence server 100 is connected to at least one mobile client terminal TA and to at least one of the existing messaging servers S1, S2 in such a way that the information intended for or sent by said mobile client terminal transit by said virtual presence server during the session.

In practice, when user A of mobile client terminal TA wishes to open an instantaneous messaging session, a computer application placed in said terminal sends a presence request intended for virtual presence server 100. This presence request can contain the identification of the user and a password needed for the virtual presence server 100 to authorise the connection. This is conventional management of access authorisation. In certain exemplary embodiments, the presence request contains a piece of unique information making it possible to identify user A in a unique manner. This exchange of information is performed by the intermediary of a conventional communications protocol: HTTP, SMS, TCP or other connection. In the same way as with systems known in the art, as long as user A personally keeps his instantaneous messaging session open, the computer application of his mobile client terminal TA periodically continues to send presence requests according to a certain frequency or stands by for information coming from virtual presence server 100.

After analysing the information for identifying user A, virtual presence server 100 authorises the connection and allocates a memory space wherein it will keep a copy of the information that is going to circulate.

Once the connection has been established between the mobile client terminal TA and the virtual presence server 100, the latter connects to at least one of the messaging servers S1 and/or S2 in such a way that the information intended for or sent by said mobile client terminal transits by said virtual presence server during the session.

According to the community that users B1, C1, D1, B2, E2, F2 with whom user A is likely to converse are a member of, virtual presence server 100 will connect to instantaneous messaging server S1 linked to a first community Co1, or to instantaneous messaging server S2 linked to another community Co2. If user A wishes to converse with users present across several communities, the virtual presence server will simultaneously connect to the different messaging servers S1, S2. Virtual presence server 100 thus serves as a gateway between the mobile client terminal TA and the instantaneous messaging service servers S1 and/or S2 involved, by allowing the messages and requests to transit, and by applying certain action rules if needed.

In order to establish the connection, presence server 100 sends a presence request to the messaging servers S1 and/or S2 involved. This presence request is similar to that sent by the computer application of the mobile client terminal TA and contains information making it possible to identify user A. The fact that a presence request similar to that sent by mobile terminal TA is sent makes it possible to avoid modifying the identification protocols integrated into existing messaging servers S1, S2. In an alternative embodiment, instead of sending new presence requests, virtual presence server 100 allows the presence requests sent periodically by the computer application placed in the mobile client terminal TA to be transmitted to messaging servers S1 and/or S2.

After analysing the information for identifying user A, messaging servers S1 and/or S2 authorise the opening of the instantaneous messaging session. Messaging servers S1 and/or S2 then inform the other users B1, C1, D1, B2, E2, F2 that user A is connected and ready to converse. Also, messaging servers S1 and/or S2 can transmit to virtual presence server 100 the state of presence of the other users B1, C1, D1, B2, E2, F2 in session and ready to converse with user A. User A can then converse with users B1, C1, D1, B2, E2, F2 that have opened a session.

Virtual presence server 100 is thus perceived by messaging servers S1 and/or S2 as being the mobile terminal of user A. Here, the meaning of the expression "virtual presence" is understood since, for instantaneous messaging service servers S1 and/or S2, server 100 corresponds virtually to mobile client terminal TA.

When a request sent for this purpose is received by the virtual presence server 100, the instantaneous messaging service servers S1 and/or S2 transmit to said virtual presence server the contact lists of user A. The latter are then stored in a storage area of virtual presence server 100.

The identity of users B1, C1, D1, B2, E2, F2 registered in these contact lists is for example communicated to virtual presence server 100 via the transmission of their name (for example "B1", "C1", "D1", "B2", "E2", "F2") and/or their email address (for example "B1@Co1.com", "C1@Co1.com", "D1@Co1.com", "B2@Co2.com", "E2@Co2.com", "F2@Co2.com"), etc.

Compared with the known instantaneous messaging system shown in FIG. 1, virtual presence server 100 comprises a means to aggregate the different contact lists received in order to only manage a single list 110 in which are registered the identities of the different users B1, C1, D1, B2, E2, F2, without distinction as to the community that said users are members of. In practice, aggregating contact lists is performed by the intermediary of a programme, subroutine or other.

In order to manage the conversation efficiently, it is possible that user A wishes to converse only with a part of his contacts and filter messages coming from other users. To that end, virtual presence server 100 comprises a database containing filtering rules intended to be applied to the messages sent by the terminals of users B1, C1, D1, B2, E2, F2 registered in the contact lists transmitted to said server. These filtering rules can be applied during the normal operation of the instantaneous messaging session and/or during automatic management of the session by virtual presence server 100.

For example, mobile client terminal TA may comprise a computer application allowing to transmit the filtering rules to virtual presence server 100 that user A wishes to have associated with the different users B1, C1, D1, B2, E2, F2, said server being equipped with means to record these filtering rules in the database.

In reference to the example in FIG. 2, user A wishes to receive messages only from users B1, B2 and E2 and wishes to filter messages from C1, D1 and F2. To that end, the computer application placed in the mobile client terminal TA transmits a request to virtual presence server 100 intended to indicate that the messages coming from users B1, B2 and E2 can be communicated to him (B1=OK; B2=OK; E2=OK) and that messages coming from users C1, D1 and F2 must be filtered (C1=NO; D1=NO; F2=NO).

Mobile client terminal TA can integrate a specific interface making it possible to choose, for each one of his contacts, a predetermined filtering rule. This can be a graphical interface on which is presented the list of the different contacts, a pull-down menu being associated with each one of said contacts, said pull-down menu presenting the different filtering rules. User A must then simply validate a filtering rule for each one of his contacts. Certain filtering rules can be defined as defaults. For example, if user A does not choose any particular filtering rule for a contact, the messages sent by the latter are considered to be authorised to transit to the mobile client terminal TA. Once the filtering rules have been defined, the computer application of the mobile client terminal TA transmits this data to virtual presence server 100.

Filtering rules are more preferably programmes or programme commands developed by the designers of virtual presence server 100 and integrated into said server. Operators of instantaneous messaging services therefore no longer have to modify their messaging server S1 and/or S2 in order to offer this filtering service to user A.

In certain exemplary embodiments, virtual presence server 100 is equipped with means to analyse the contact lists transmitted by the mobile client terminal, and to check if for each of users B1, C1, D1, B2, E2, F2, registered in said lists, one or several filtering rules are already recorded in the database. This feature allows user A to not have to systematically transmit the same filtering rules to virtual presence server 100. This analysis can be performed by the intermediary of a table of correspondence associating to the users already registered in the contact list 110, the last filtering rule that they were subject to.

In certain exemplary embodiments, virtual presence server 100 comprises a means to transmit an alert message to terminals TC1, TD1, TF2 of users C1, D1, F2 of which the messages have been filtered. Likewise, virtual presence server 100 will be able to transmit an alert message to the mobile client terminal TA of user A when a message is filtered. The alert message can be of the SMS, MMS, e-mail, or other type and transit by a communications network known by those skilled in the art.

In reference to FIG. 2, it can happen that a single user B is a member of two different communities Co1 and Co2. In this case, he will have two different identities according to whether he is connected to one or the other of the communities, for example B@Co1.com and B@Co2.com. When user B opens an instantaneous messaging session on the first community Co1, he is seen by virtual presence server 100 as a first user B1 having for identity: B@Co1.com. Likewise, when user B opens an instantaneous messaging session on a second community Co2, he is seen by virtual presence server 100 as a second user B2 having for identity: B@Co2.com.

In certain exemplary embodiments, virtual presence server 100 is configured to recognise that users B1 and B2 are in fact a single person. To that end, the computer application placed in the mobile client terminal TA transmits a piece of information to virtual presence server 100 indicating that users B1 and B2 having different identities must be treated as a single user B. As such, virtual presence server 100 will be able to choose to connect to instantaneous messaging server S1 or S2 to which mobile terminal TB1 or TB2 of user B is connected. Virtual presence server 100 will therefore be able to establish this connection independently to the community that user B is a member of, while preserving user A's ability to converse with user B.

Likewise, user A will be able to define a single filtering rule for user B, with virtual presence server 100 being configured to apply this filtering rule to the messages intended for or sent by terminals TB1 or TB2 of users B1 or B2.

As long as user A of mobile client terminal TA keeps his session open, virtual presence server 100 allows the messages to transit to said mobile terminal. Virtual presence server 100 can also let the presence requests sent periodically by the computer application placed in the mobile client terminal TA transit to the messaging servers S1 and/or S2. Also, virtual presence server 100 allows the update requests or others to transit, coming from messaging serves S1 and/or S2 and intended for mobile terminal TA.

In certain embodiments, as soon as user A closes his instantaneous messaging session, virtual presence server 100 activates means of management and automatically manages the instantaneous messaging session in place of said user A. In this configuration, the virtual presence server has a substantially active role.

The means of management are processors, controllers or any other equivalent software/hardware that makes it possible to manage events that occur on virtual presence server 100. By executing one or several programmes, subroutines, firmware or others, the means of management are able to manage the instantaneous messaging session in place of user A. In particular, the means of management are configured to receive and store the messages sent by the other users B1, C1, D1, B2, E2, F2 that are still in session and send other messages as a response to said users.

When user A closes his instantaneous messaging session, the computer application placed in his mobile client terminal TA transmits a request for this purpose to virtual presence server 100. As soon as this request is received, virtual presence server 100 activates the means of management. This activation can also be subject to receiving a piece of information indicating explicitly that user A wishes that virtual presence server 100 continue to manage his session automatically. In practice, this request contains a code or a portion of a code that is able, when executed, to activate the means of management.

In a complementary manner and/or as an alternative embodiment, virtual presence server 100 may be configured to activate the means of management when the connection between mobile client terminal TA and said virtual presence server is cut off. It is indeed possible that user A closes his session without the computer application placed in his mobile client terminal TA having had the time to transmit the closing request. In practice, when the connection between the mobile client terminal TA and virtual presence server 100 is cut off, an application placed in said server activates the means of management.

Once activated, the means of management maintains the connection between virtual presence server 100 and the instantaneous messaging service servers S1 and/or S2. As such, servers S1 and/or S2 continue to receive and send requests without detecting the absence of user A and continue to manage the instantaneous messaging session as if said user A were still connected.

Receiving messages sent by users B1, C1, D1, B2, E2, F2 that are still in session, controls the means of management in such a way that it stores said messages in a storage area of virtual presence server 100. As such, when user A opens his instantaneous messaging session again, he will be able to take note of all of the messages that have been exchanged.

When the session is managed automatically, the means of management can control the sending of an alert message intended for mobile client terminal TA, when a message sent by terminals TB1, TC1, TD1, TB2, TE2, TF2 of users B1, C1, D1, B2, E2, F2 that are still in session and intended for user A, is received by virtual presence server 100. In this way, user A can be informed that one of his contacts is trying to reach him. The alert message can be of the SMS, MMS, e-mail, or other type and transit by a communications network known by those skilled in the art.

Messaging servers S1 and/or S2 may comprise means to transmit a presence request to virtual presence server 100 when a new user registered in the contact lists opens an instantaneous messaging session. In this case, the reception of this presence request activates the means of management of virtual presence server 100 in such a way that said means of management sends an alert message intended for mobile client terminal TA. User A can thus be informed that one of his contacts is ready to communicate with him. The alert message can be of the SMS, MMS, e-mail, or other type and transit by a communications network known by those skilled in the art.

In the same way, when virtual presence server 100 detects a new event (new message, etc.) that is likely to be of interest to user A, the means of management can send an alert message intended for mobile client terminal TA.

In case of automatic management of the session, it can also be beneficial to alert the other users B1, C1, D1, B2, E2, F2 that are still in session, that user A cannot respond immediately, but that they can continue to converse normally as if he were still present. Indeed, the other users B1, C1, D1, B2, E2, F2 could find it surprising that user A is no longer participating in the conversation although it is assumed that he is still in session.

To that end, once activated, the means of management controls the sending of an alert message intended for terminals TB1, TC1, TD1, TB2, TE2, TF2 of the other users B1, C1, D1, B2, E2, F2 that are still in session. The alert message can be of the SMS, MMS, e-mail, or other type and transit by messaging serves S1 and/or S2 or by another communications network known by those skilled in the art.

Virtual presence server 100 in accordance with the invention thus makes it possible to aggregate several features that an instantaneous messaging server S1 and/or S2 would not be able to support, unless complex modifications are carried out.

Those skilled in the art will recognize, or be able to ascertain using no more than routine experimentation, many equivalents to the specific embodiments of the invention described herein. The scope of the present invention is not intended to be limited to the above Description, but rather is as set forth in the following claims.

I claim:

1. An instant messaging system, comprising:
   at least two instant messaging service servers configured to deliver instant messaging services to mobile terminals connected to the at least two instant messaging service servers and to which users of the mobile terminals have opened an instant messaging session; and
   a virtual presence server independent of the at least two instant messaging service servers, the virtual presence server being connected to a mobile client terminal and to the at least two instant messaging service servers in such a way that information intended for or sent by the mobile client terminal transits via the virtual presence server,
   wherein the at least two instant messaging service servers are configured to transmit contact lists intended for the mobile client terminal, the contact lists being intercepted by the virtual presence server, the virtual presence server aggregating the contact lists received into a single list in which are registered identities of users, without distinction as to community membership of the users, wherein a computer application executed by the mobile client terminal transmits a piece of information to the virtual presence server in order that one of the users appearing in multiple of the contact lists is represented only once in the single list generated by the virtual presence server, and wherein the virtual presence server transmits the single list to the mobile client terminal.

2. The system of claim 1, wherein the mobile client terminal transmits a piece of information to the virtual presence server indicating that the one of the users having at least two different identities must be treated as a single user.

3. The system of claim 2, wherein:
   the virtual presence server automatically manages an instant messaging session in place of a user of the mobile client terminal,
   the at least two instant messaging service servers transmit a presence request to the virtual presence server when a new user registered in the contact lists opens an instant messaging session,
   when the presence request is received, the virtual presence server sends an alert message intended for the mobile client terminal during automatic management of the messaging session.

4. The system of claim 1, wherein the virtual presence server comprises a database storing filtering rules to be applied to messages sent by the mobile terminals of the users registered in the contact lists.

5. The system of claim 4, wherein the virtual presence server transmits an alert message to ones of the mobile terminals whose messages have been filtered.

6. The system of claim 4 or 5, wherein the virtual presence server transmits an alert message to the mobile client terminal when a message is filtered.

7. The system of claim 4 or 5, wherein the mobile client terminal transmits filtering rules associated with different users to the virtual presence server, the virtual presence server recording the filtering rules in the database.

8. The system of claim 7, wherein the virtual presence server analyzes the contact lists transmitted by the mobile client terminal, and checks if, for each one of the users registered in the lists, one or several filtering rules are already recorded in the database.

9. The system of claim 4 or 5, wherein the mobile client terminal transmits a piece of information to the virtual presence server indicating that the one of the users having different identities must be treated as a single user, the virtual presence server being able to connect to the instant messaging server to which the mobile terminal of the user is connected; and the virtual presence server is configured to apply the same filtering rule to the messages intended for or sent by the mobile terminals of users having different identities but having to be treated as a single user.

10. The system of claim 1, wherein, when a connection between the mobile client terminal and the virtual presence server is cut off, the virtual presence server:
   maintains connections to the at least two instant messaging service servers;
   continues to receive messages from the users of the mobile terminals via the at least two instant messaging service servers; and
   stores the messages for later retrieval by the mobile client terminal.

11. A method for controlling a virtual presence server in an instant messaging (IM) system having client terminals that establish IM sessions with IM servers, the method comprising:
   connecting to the IM servers;
   providing connectivity with the IM servers to a first user of a mobile client terminal, wherein IM information transmitted from the mobile client terminal and IM information transmitted to the mobile client terminal is transmitted through the virtual presence server;
   intercepting contact lists sent by the IM servers and intended for the mobile client terminal, wherein each of the contact lists includes user information associated with a corresponding one of the IM servers; and
   aggregating the contact lists into a single list, wherein the first user performs IM communications with entries on the single list, the aggregating including:
      in response to a piece of information from the mobile client, selectively associating a user identity from a first one of the contact lists with a user identity from a second one of the contact lists based on the user identity from the first one of the contact lists corresponding to a first user and the user identity from the second one of the contact lists also corresponding to the first user; and including a single entry in the single list that corresponds to both the user identity from the first one of the contact lists and the user identity from the second one of the contact lists.

12. The method of claim 11, further comprising receiving an indication from the mobile client terminal that specifies the user identity from the first one of the contact lists and the user identity from the second one of the contact lists, wherein the selectively associating is performed based on the indication.

13. The method of claim 11, further comprising:
selectively automatically managing an IM session on behalf of the first user;
receiving a message from one of the IM servers indicating presence of a new user; and
during automatic management of the IM session, sending an alert to the mobile client terminal when the message indicating presence of the new user is received.

14. The method of claim 11, further comprising storing a database of filtering rules applied to IM messages.

15. The method of claim 14, wherein a single one of the filtering rules applies both to messages from the client terminal associated with the user identity from the first one of the contact lists and to messages from the client terminal associated with the user identity from the second one of the contact lists.

16. The method of claim 15, further comprising, when a message from one of the users user is filtered, transmitting an alert to the one of the users.

17. The method of claim 15, further comprising transmitting, when a message from one of the users user is filtered, transmitting an alert to the mobile client terminal.

18. The method of claim 15, wherein filtering comprises discarding messages from the client terminal associated with the user identity from the first one of the contact lists and discarding messages from the client terminal associated with the user identity from the second one of the contact lists.

19. The method of claim 14, further comprising receiving the filtering rules from the mobile client terminal.

20. An instant messaging (IM) system, comprising:
IM servers configured to deliver IM services to mobile terminals connected to the IM servers and to which users of the mobile terminals have opened IM sessions; and
a virtual presence server independent of the IM servers, the virtual presence server being connected to a mobile client terminal and to the IM servers, the virtual presence server intercepting and selectively retransmitting information sent by the mobile client terminal and information intended for the mobile client terminal,
wherein the IM servers transmit contact lists intended for the mobile client terminal, the lists being intercepted by the virtual presence server, the virtual presence server aggregating the contact lists received into a single list in which are registered identities of users, without distinction as to community membership of the users,
wherein the mobile client terminal transmits a piece of information to the virtual presence server instructing that one of the users appearing in multiple of the contact lists be treated as a single user, the virtual presence server including the one of the users only once in the single list,
wherein the virtual presence server transmits the single list to the mobile client terminal,
wherein the mobile client terminal transmits filtering rules to the virtual presence server, the virtual presence server recording the filtering rules in a database, the virtual presence server discarding messages from ones of the mobile terminals based on the filtering rules and transmitting an alert message to ones of the mobile terminals whose messages have been filtered, and
wherein the virtual presence server applies a single filtering rule to messages from the one of the users regardless of from which of the IM servers the messages arrive.

* * * * *